United States Patent
Hsieh et al.

(10) Patent No.: US 10,627,605 B2
(45) Date of Patent: Apr. 21, 2020

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Tung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/250,976

(22) Filed: Jan. 17, 2019

(65) Prior Publication Data
US 2019/0170979 A1     Jun. 6, 2019

Related U.S. Application Data

(63) Continuation of application No. 14/989,569, filed on Jan. 6, 2016, now Pat. No. 10,228,535.

(30) Foreign Application Priority Data

Nov. 27, 2015 (TW) .............................. 104139707 A

(51) Int. Cl.
| | | |
|---|---|---|
| *G02B 13/00* | (2006.01) | |
| *G02B 13/06* | (2006.01) | |
| *G02B 13/14* | (2006.01) | |
| *G02B 9/62* | (2006.01) | |
| *G02B 27/00* | (2006.01) | |

(52) U.S. Cl.
CPC ........... *G02B 13/0045* (2013.01); *G02B 9/62* (2013.01); *G02B 13/008* (2013.01); *G02B 13/06* (2013.01); *G02B 13/14* (2013.01); *G02B 27/0025* (2013.01)

(58) Field of Classification Search
CPC ...... G02B 9/62; G02B 13/0045; G02B 13/06; G02B 13/14; G02B 13/008; G02B 27/0025
USPC .................................................. 359/357, 713
See application file for complete search history.

(56) References Cited

U.S. PATENT DOCUMENTS

| | | | | |
|---|---|---|---|---|
| 9,632,288 | B2 * | 4/2017 | Asami | G02B 13/04 |
| 2013/0010181 | A1 | 1/2013 | Baba | |
| 2016/0103300 | A1 * | 4/2016 | Tang | G02B 27/0025 348/335 |
| 2016/0131872 | A1 * | 5/2016 | Tang | G02B 13/0045 359/713 |
| 2016/0131873 | A1 * | 5/2016 | Tang | G02B 13/0045 359/713 |
| 2016/0154211 | A1 * | 6/2016 | Jo | G02B 13/0045 359/713 |
| 2018/0074296 | A1 * | 3/2018 | Lee | G02B 13/0045 |

* cited by examiner

*Primary Examiner* — William R Alexander
*Assistant Examiner* — Alberto J Betancourt
(74) *Attorney, Agent, or Firm* — Maschoff Brennan

(57) ABSTRACT

A photographing optical lens assembly includes, in order from an object side to an image side, a first lens element, a second lens element, a third lens element, a fourth lens element, a fifth lens element and a sixth lens element. The first lens element with negative refractive power has an image-side surface being concave. The second lens element has an image-side surface being concave. The fourth lens element has an image-side surface being convex. The sixth lens element has an object-side surface being concave. The photographing optical lens assembly has a total of six lens elements.

20 Claims, 15 Drawing Sheets

PHOTOGRAPHING OPTICAL LENS ASSEMBLY, IMAGE CAPTURING UNIT AND ELECTRONIC DEVICE

RELATED APPLICATIONS

This application is a continuation patent application of U.S. application Ser. No. 14/989,569, filed on Jan. 6, 2016, which claims priority to Taiwan Application 104139707, filed Nov. 27, 2015, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have reduced the pixel size of sensors, and compact optical systems have gradually evolved toward the field of higher megapixels, there is an increasing demand for compact optical systems featuring better image quality.

With the popularity of electronic devices, such as household appliances, video game consoles, surveillance cameras, automobiles, smartphones, wearable devices and digital tablets, including the optical system for the applications of image recognition and motion sensing, some electronic devices operated in a low-light condition require an optical system having a large aperture for providing sufficient amount of light. However, although the conventional optical system can provide a large aperture with sufficient incident light, its image resolution is often reduced along with poor image quality. Therefore, there is a need to develop an optical system satisfying the requirement of a large aperture and high image quality simultaneously.

SUMMARY

According to one aspect of the present disclosure, a photographing optical lens assembly includes, in order from an object side to an image side, a first lens element, a second lens element, a third lens element, a fourth lens element, a fifth lens element and a sixth lens element. The first lens element with negative refractive power has an image-side surface being concave. The second lens element has an image-side surface being concave. The fourth lens element has an image-side surface being convex. The sixth lens element has an object-side surface being concave. The photographing optical lens assembly has a total of six lens elements. When the number of the lens elements of the photographing optical lens assembly having an Abbe number smaller than 40 is Vn(40), a maximum image height of the photographing optical lens assembly is ImgH, an entrance pupil diameter of the photographing optical lens assembly is EPD, an axial distance between an object-side surface of the first lens element and an image surface is TL, a focal length of the photographing optical lens assembly is f, the following conditions are satisfied:

$$4 \leq Vn(40);$$

$$0.85 < ImgH/EPD < 2.20; \text{ and}$$

$$6.0 < TL/f.$$

According to another aspect of the present disclosure, a photographing optical lens assembly includes, in order from an object side to an image side, a first lens element, a second lens element, a third lens element, a fourth lens element, a fifth lens element and a sixth lens element. The first lens element with negative refractive power has an image-side surface being concave. The second lens element has an image-side surface being concave. The fourth lens element has an image-side surface being convex. The sixth lens element has an object-side surface being concave. The photographing optical lens assembly has a total of six lens elements. When the number of the lens elements of the photographing optical lens assembly having an Abbe number smaller than 30 is Vn(30), a maximum image height of the photographing optical lens assembly is ImgH, an entrance pupil diameter of the photographing optical lens assembly is EPD, an axial distance between an object-side surface of the first lens element and an image surface is TL, a focal length of the photographing optical lens assembly is f, the following conditions are satisfied:

$$3 \leq Vn(30);$$

$$0.85 < ImgH/EPD < 2.20; \text{ and}$$

$$7.0 < TL/f.$$

According to still another aspect of the present disclosure, a photographing optical lens assembly applicable for a wavelength range from 800 nanometers (nm) to 1200 nm includes a total of six lens elements. When a maximum image height of the photographing optical lens assembly is ImgH, an entrance pupil diameter of the photographing optical lens assembly is EPD, an axial distance between an object-side surface of a lens element closest to an imaged object and an image surface is TL, a focal length of the photographing optical lens assembly is f, a maximal field of view of the photographing optical lens assembly is FOV, the following conditions are satisfied:

$$0.60 < ImgH/EPD < 1.80;$$

$$7.0 < TL/f; \text{ and}$$

$$80 \text{ degrees} < FOV.$$

According to yet still another aspect of the present disclosure, an image capturing unit includes one of the aforementioned photographing optical lens assemblies and an image sensor, wherein the image sensor is disposed on the image side of the photographing optical lens assembly.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
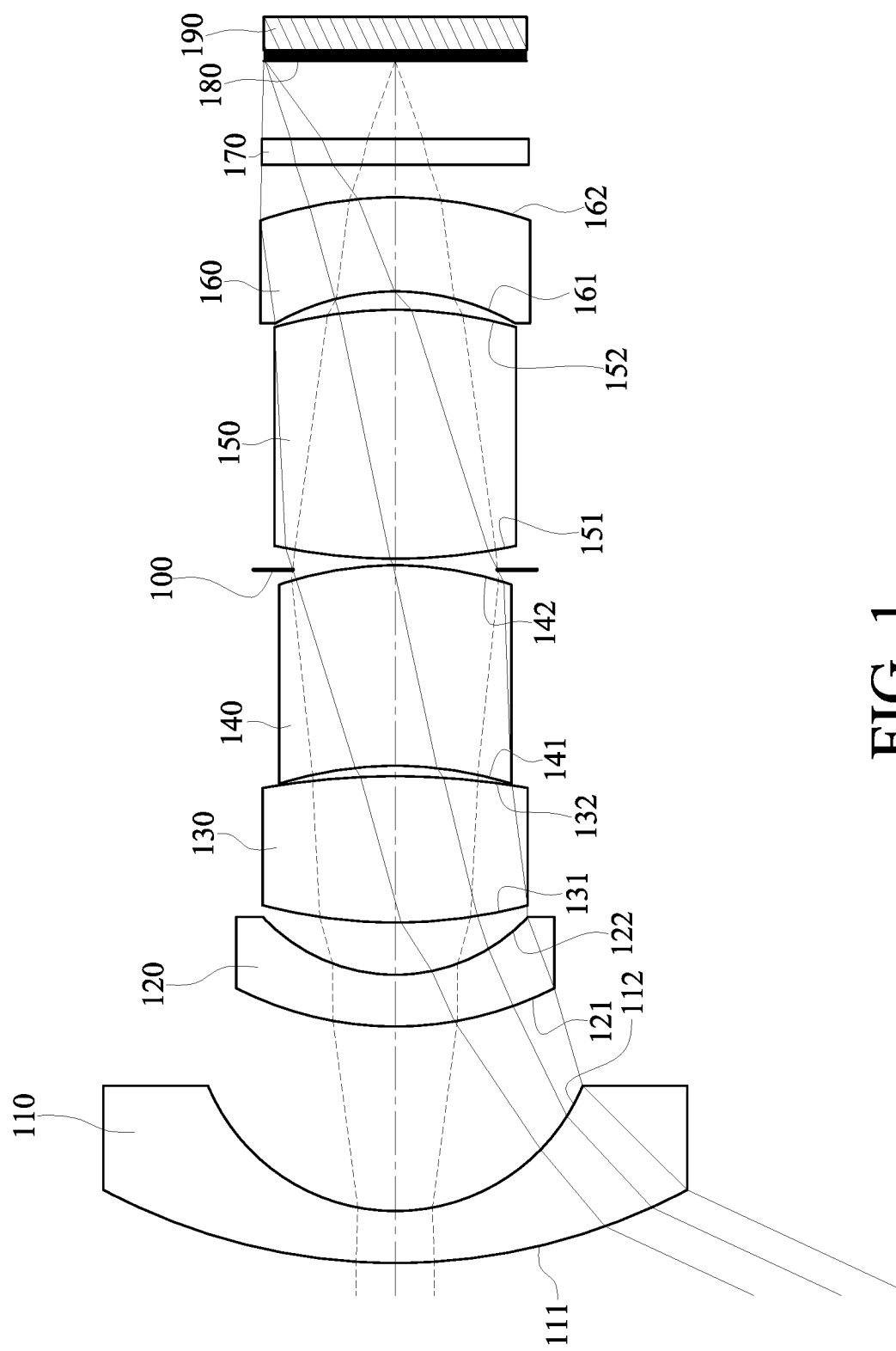
FIG. 1 is a schematic view of an image capturing unit according to the 1st embodiment of the present disclosure.

A photographing optical lens assembly includes, in order from an object side to an image side, a first lens element, a second lens element, a third lens element, a fourth lens element, a fifth lens element and a sixth lens element. The photographing optical lens assembly has a total of six lens elements.

The first lens element can have negative refractive power and an image-side surface being concave. Therefore, it is favorable for transmitting the light ray at a large view angle from the off-axial region into the photographing optical lens assembly, and the lens element close to the image side of the photographing optical lens assembly is favorable for projecting the incident light ray on an image surface.

The second lens element can have an image-side surface being concave. Therefore, it is favorable for correcting chromatic aberration.

The fourth lens element can have an image-side surface being convex. Therefore, it is favorable for correcting Petzval's sum of the photographing optical lens assembly so as to improve the flatness of the image surface and reduce astigmatism.

The fifth lens element can have positive refractive power. Therefore, it is favorable for reducing the total track length of the photographing optical lens assembly.

The sixth lens element can have an object-side surface being concave. Therefore, it is favorable for reducing the incident angle of the light projecting onto the image sensor so as to improve the image-sensing efficiency of the image sensor and further correcting aberrations at the off-axial region. Furthermore, the sixth lens element can have an image-side surface being convex so as to reduce the chief ray angle.

When the number of the lens elements of the photographing optical lens assembly having an Abbe number smaller than 30 is Vn(30), the number of the lens elements of the photographing optical lens assembly having the Abbe number smaller than 40 is Vn(40), at least one of the following condition is satisfied: $4 \leq Vn(40)$ and $3 \leq Vn(30)$. Therefore, it is favorable for obtaining a balance between the choices of lens materials and the image quality, especially, when the photographing optical lens assembly is applicable for the infrared wavelength range. Preferably, the infrared wavelength range can be 800 nm to 1200 nm.

When a maximum image height of the photographing optical lens assembly (half of a diagonal length of an effective photosensitive area of the image sensor) is ImgH, an entrance pupil diameter of the photographing optical lens assembly is EPD, the following condition is satisfied: $0.85 < ImgH/EPD < 2.20$. Therefore, it is favorable for providing sufficient amount of incident light at both the paraxial region and the off-axial region so as to enhance the relative illumination when the photographing optical lens assembly has a large view angle. Preferably, the following condition can also be satisfied: $0.60 < ImgH/EPD < 1.80$. More preferably, the following condition can also be satisfied: $1.0 < ImgH/EPD < 2.0$.

According to the disclosure, an object-side surface of the first lens element is the closest to an imaged object among all surfaces of the lens elements of the photographing optical lens assembly. When an axial distance between the object-side surface of the first lens element and the image surface is TL, a focal length of the photographing optical lens assembly is f, the following condition is satisfied: $6.0 < TL/f$. Therefore, it is favorable for providing the photographing optical lens assembly with sufficient field of view and image resolution while preventing the total track length from overly long. Preferably, the following condition can also be satisfied: $7.0 < TL/f$. More preferably, the following condition can also be satisfied: $7.0 < TL/f < 12.0$.

The fifth lens element can have the strongest refractive power among the lens elements of the photographing optical lens assembly. That is, the absolute value of the refractive power of the fifth lens element can be greater than the absolute value of the refractive power of every lens element of the first lens element, the second lens element, the third lens element, the fourth lens element and the sixth lens element. Therefore, the fifth lens element is favorable for providing sufficient refractive power at the image side of the photographing optical lens assembly to converge the incident light. Furthermore, it is favorable for reducing a back focal length of the photographing optical lens assembly so as to maintain a compact size thereof when the sixth lens element has negative refractive power. The refractive power of a lens element is defined as a ratio of the focal length of the photographing optical lens assembly to the focal length of the lens element. The lens element with the strongest refractive power among all lens elements can be defined by having the largest absolute value of refractive power among all lens elements. Moreover, at least three of the lens elements of the photographing optical lens assembly can have negative refractive power.

When a maximal field of view of the photographing optical lens assembly is FOV, the following condition is satisfied: 80 degrees<FOV. Therefore, it is favorable for enlarging the field of view. Preferably, the following condition can also be satisfied: 95 degrees<FOV<180 degrees.

When a focal length of the first lens element is f1, a focal length of the fourth lens element is f4, the following condition can be satisfied: |f1/f4|<0.80. Therefore, it is favorable for provide the proper refractive power distribution at the middle of the photographing optical lens assembly so as to prevent overcorrecting aberrations.

When the focal length of the photographing optical lens assembly is f, an entrance pupil diameter of the photographing optical lens assembly is EPD, the following condition can be satisfied: f/EPD<2.0. Therefore, it is favorable for increasing the amount of incident light so as to enhance the resolution in the low light condition. Preferably, the following condition can also be satisfied: f/EPD<1.75.

The photographing optical lens assembly can further include an aperture stop, wherein there can be a front lens group including at least one lens element of the photographing optical lens assembly located between an imaged object and the aperture stop, and a rear lens group including the other at least one lens element of the photographing optical lens assembly located between the aperture stop and the image surface. When a focal length of the front lens group is ff, a focal length of the rear lens group is fr, the following condition can be satisfied: 0<ff/fr<1.25. Therefore, it is favorable for balancing the refractive power distribution of the photographing optical lens assembly between two sides of the aperture stop so as to provide the features of a large aperture and a compact size simultaneously. According to the disclosure, either of the front lens group or the rear lens group may include one or more lens elements. When the front or rear lens group includes only one lens element, the focal length of the front or rear lens group is equal to a focal length of the lens element. When the front or rear lens group includes plural lens elements, the focal length of the front or rear lens group is equal to a composite focal length of the lens elements.

When a mean of the maximum effective radii of the surfaces among the third lens element, the fourth lens element, the fifth lens element and the sixth lens element is SDavg, a radius of the aperture stop is SDstop, the following condition can be satisfied: 0.5<SDavg/SDstop<1.25. Therefore, it is favorable for providing sufficient amount of incident light at the off-axial region. According to the disclosure, each of the surfaces of the third lens element, the fourth lens element, the fifth lens element and the sixth lens element has a maximum effective radius, and SDavg is equal to the arithmetic mean of the total eight maximum effective radii.

When a curvature radius of the image-side surface of the second lens element is R4, the focal length of the photographing optical lens assembly is f, the following condition can be satisfied: 0.50<R4/f<4.5. Therefore, it is favorable for correcting aberrations generated from the first lens element.

When an axial distance between the first lens element and the second lens element is T12, a sum of axial distances between every two lens elements of the photographing optical lens assembly that are adjacent to each other is ΣAT, the following condition can be satisfied: 0.45<T12/ΣAT<0.85. Therefore, it is favorable for keeping the lens elements close to the image surface compact and reducing the difficulty in lens assembling.

According to the disclosure, the image-side surface of the sixth lens element is the closest to the image surface among all surfaces of the lens elements of the photographing optical lens assembly. When an axial distance between the image-side surface of the sixth lens element and the image surface is BL, the axial distance between the object-side surface of the first lens element and the image surface is TL, the following condition can be satisfied: 0<BL/TL<0.20. Therefore, it is favorable for reducing the back focal length so as to keep the photographing optical lens assembly compact.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the photographing optical lens assembly can also be reduced. The lens element made of glass material is favorable for reducing the sensitivity of the photographing optical lens assembly, and the lens element made of plastic material is easily shaped for correcting the aberration.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly on the corresponding image sensor, can be flat or curved, particularly a concave curved surface facing towards the object side of the photographing optical lens assembly.

According to the present disclosure, the photographing optical lens assembly can include at least one stop, such as an aperture stop, a glare stop or a field stop. Said glare stop or said field stop is allocated for eliminating the stray light and thereby improving the image quality thereof.

According to the present disclosure, an image capturing unit includes the aforementioned photographing optical lens assembly, and an image sensor, wherein the image sensor is disposed on the image side, which can be on or near an image surface of the aforementioned photographing optical lens assembly. In some embodiments, the image capturing unit can further include a barrel member, a holding member or a combination thereof.

Figure 13:
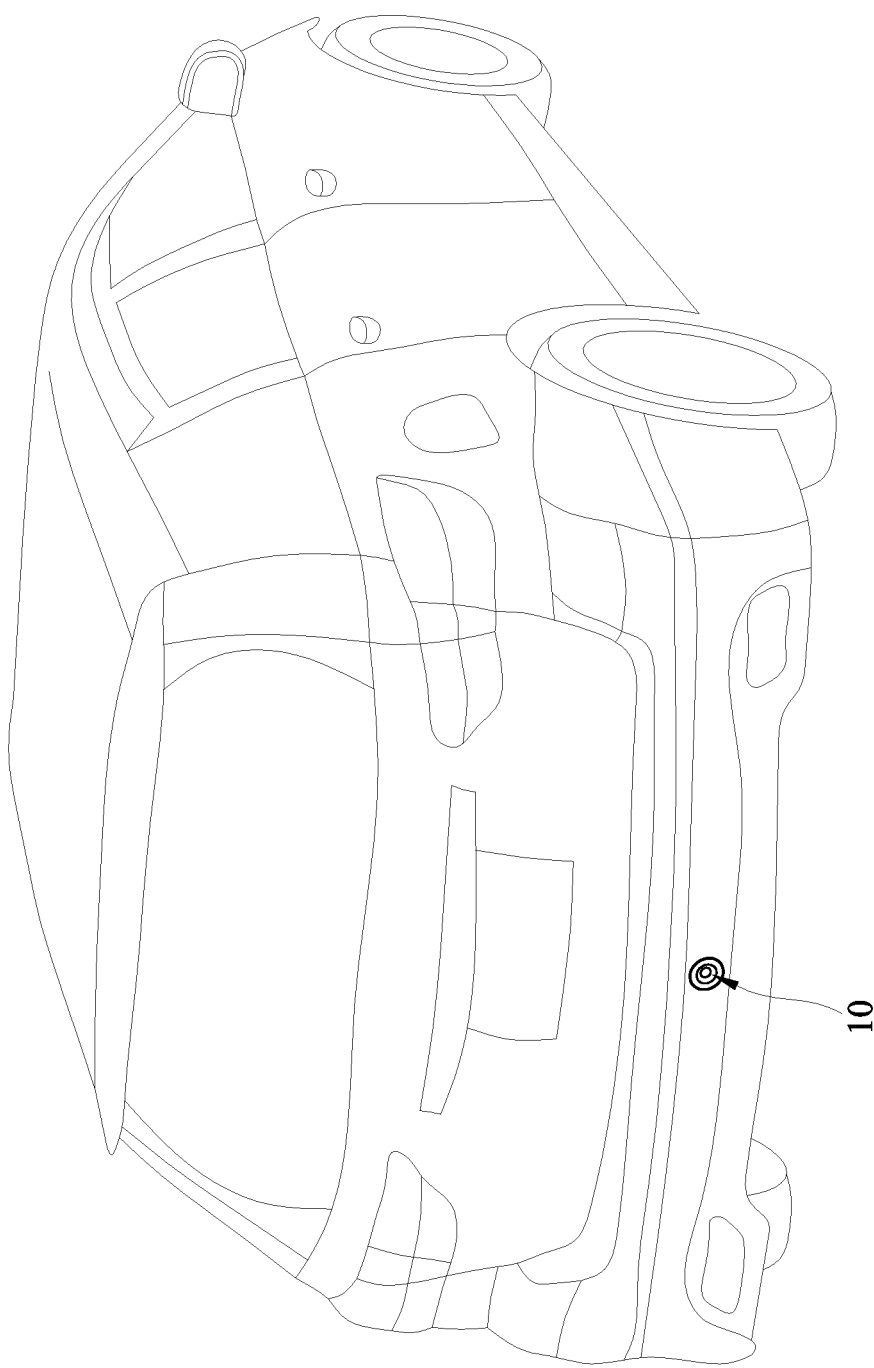
FIG. 13 shows an electronic device according to one embodiment.
Figure 14:
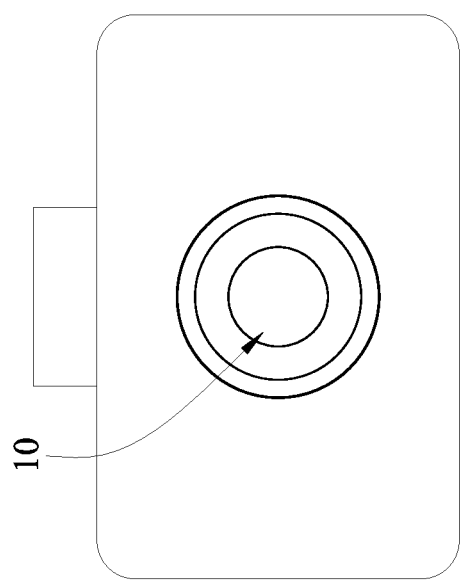
FIG. 14 shows an electronic device according to another embodiment.
Figure 15:
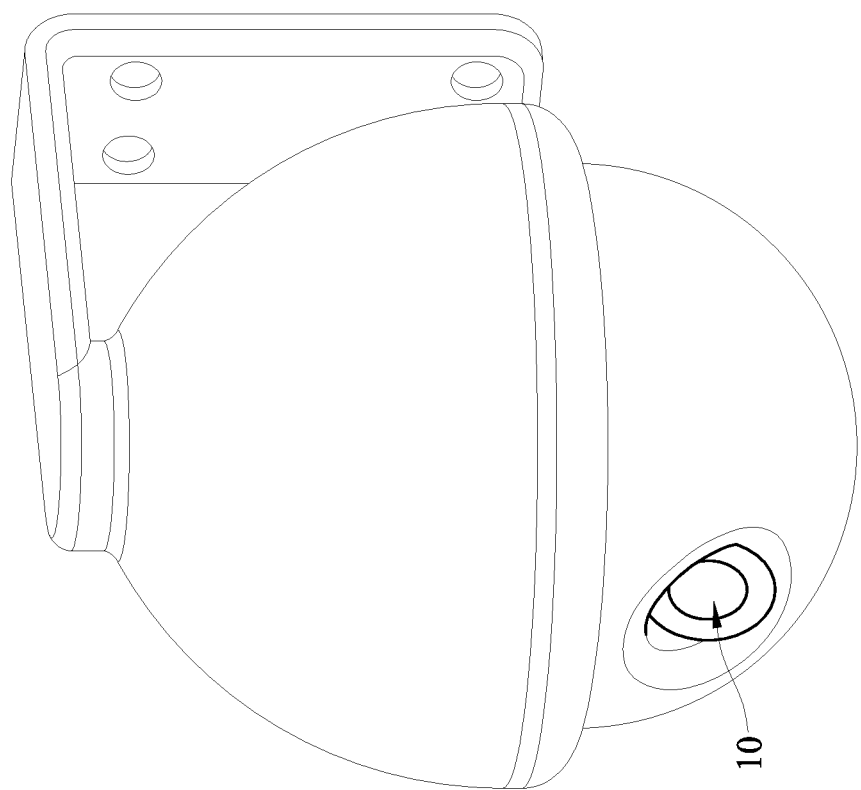
FIG. 15 shows an electronic device according to still another embodiment.

In FIG. 13, FIG. 14, and FIG. 15, an image capturing unit 10 may be installed in, but not limited to, an electronic device, including a vehicle backup camera (FIG. 13), a dashboard camera (FIG. 14) or a surveillance device (FIG. 15). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in aberration corrections and high image quality, and can be applied to 3D (three-dimensional) image capturing applications, in products such as mobile devices, wearable devices, smart televisions, network surveillance devices, motion sensing input devices, dashboard cameras, vehicle backup cameras and other electronic imaging devices. The photographing optical lens assembly can also be applied to infrared image capturing applications such as motion sensing and low-light photography. In detail, the photographing optical lens assembly can be applicable for the wavelength range from 800 nm to 1200 nm, but the disclosure is not limited thereto. According to the above description of the present disclosure, the following specific embodiments are provided for further explanation.

1st Embodiment

Figure 2:
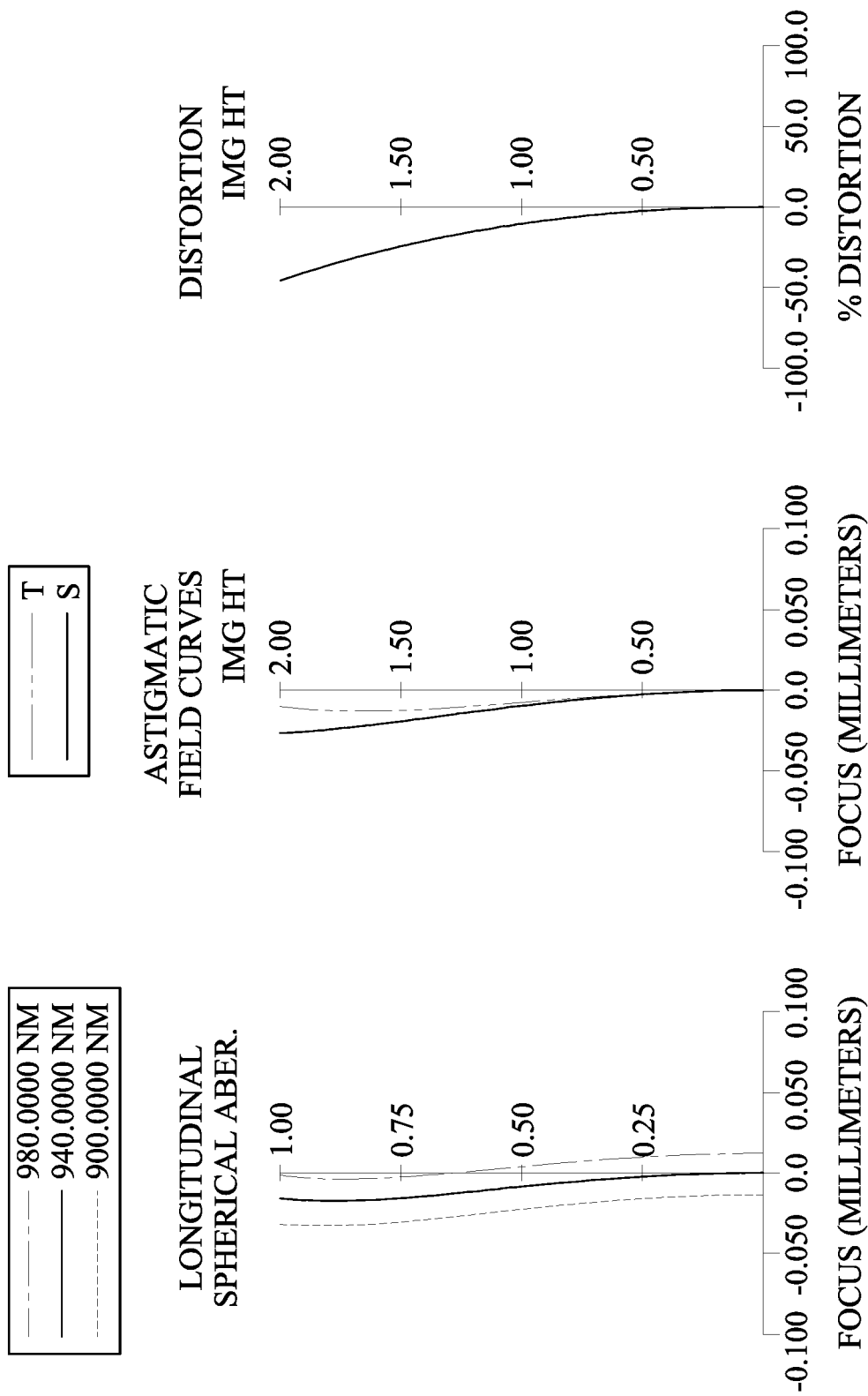
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 190. The photographing optical lens assembly includes, in order from an object side to an image side, a first lens element 110, a second lens element 120, a third lens element 130, a fourth lens element 140, an aperture stop 100, a fifth lens element 150, a sixth lens element 160, a filter 170 and an image surface 180, wherein the photographing optical lens assembly has a total of six lens elements (110-160). A front lens group includes the first lens element 110, the second lens element 120, the third lens element 130 and the fourth lens element 140, and a rear lens group includes the fifth lens element 150 and the sixth lens element 160.

The first lens element 110 with negative refractive power has an object-side surface 111 being convex and an image-side surface 112 being concave. The first lens element 110 is made of glass material and has the object-side surface 111 and the image-side surface 112 being both spherical.

The second lens element 120 with negative refractive power has an object-side surface 121 being convex and an image-side surface 122 being concave. The second lens element 120 is made of glass material and has the object-side surface 121 and the image-side surface 122 being both spherical.

The third lens element 130 with positive refractive power has an object-side surface 131 being convex and an image-side surface 132 being convex. The third lens element 130 is made of glass material and has the object-side surface 131 and the image-side surface 132 being both spherical.

The fourth lens element 140 with positive refractive power has an object-side surface 141 being concave and an image-side surface 142 being convex. The fourth lens element 140 is made of glass material and has the object-side surface 141 and the image-side surface 142 being both spherical.

The fifth lens element 150 with positive refractive power has an object-side surface 151 being convex and an image-side surface 152 being convex. The fifth lens element 150 is made of glass material and has the object-side surface 151 and the image-side surface 152 being both spherical.

The sixth lens element 160 with negative refractive power has an object-side surface 161 being concave and an image-side surface 162 being convex. The sixth lens element 160 is made of glass material and has the object-side surface 161 and the image-side surface 162 being both spherical.

The filter 170 is made of glass material and located between the sixth lens element 160 and the image surface 180, and will not affect the focal length of the photographing optical lens assembly. The image sensor 190 is disposed on or near the image surface 180 of the photographing optical lens assembly.

In this embodiment, the fifth lens element 150 has the strongest refractive power among all lens elements of the photographing optical lens assembly (110-160). Since the refractive power of a lens element is inversely related to its focal length, the fifth lens element 150 has the largest absolute value of refractive power as shown in the Table 1 below by having the smallest focal length value (|f5|=4.09).

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=1.80 millimeters (mm); Fno=1.50; and HFOV=65.0 degrees (deg.).

When the focal length of the photographing optical lens assembly is f, an entrance pupil diameter of the photographing optical lens assembly is EPD, the following condition is satisfied: f/EPD=1.50, wherein f/EPD is also the definition of f-number (Fno).

When the maximal field of view of the photographing optical lens assembly is FOV, the following condition is satisfied: FOV=130.0 deg.

When an axial distance between the object-side surface 111 of the first lens element 110 and the image surface 180 is TL, the focal length of the photographing optical lens assembly is f, the following condition is satisfied: TL/f=10.28. In this embodiment, the object-side surface 111 of the first lens element is the closest to the imaged object among all the surfaces of the lens elements (110-160) of the photographing optical lens assembly.

When an axial distance between the image-side surface 162 of the sixth lens element 160 and the image surface 180 is BL, the axial distance between the object-side surface 111 of the first lens element 110 and the image surface 180 is TL, the following condition is satisfied: BL/TL=0.11. In this embodiment, the image-side surface 162 of the sixth lens element is the closest to the image surface 180 among all the surfaces of the lens elements (110-160) of the photographing optical lens assembly.

When an axial distance between the first lens element 110 and the second lens element 120 is T12, a sum of axial distances between every two lens elements of the photographing optical lens assembly that are adjacent to each other is ΣAT, the following condition is satisfied: T12/

$\Sigma AT=0.68$. In this embodiment, $\Sigma AT$ is the sum of the axial distance between the first lens element 110 and the second lens element 120, an axial distance between the second lens element 120 and the third lens element 130, an axial distance between the third lens element 130 and the fourth lens element 140, an axial distance between the fourth lens element 140 and the fifth lens element 150 and an axial distance between the fifth lens element 150 and the sixth lens element 160.

When a mean of the maximum effective radii of the third lens element 130, the fourth lens element 140, the fifth lens element 150 and the sixth lens element 160 is SDavg, a radius of the aperture stop 100 is SDstop, the following condition is satisfied: SDavg/SDstop=1.17. In this embodiment, each of the surfaces (131, 141, 151, 161, 132, 142, 152, 162) has a maximum effective radius, and SDavg is equal to the arithmetic mean of the total eight maximum effective radii.

When a maximum image height of the photographing optical lens assembly is ImgH, the entrance pupil diameter of the photographing optical lens assembly is EPD, the following condition is satisfied: ImgH/EPD=1.67.

When a curvature radius of the image-side surface 122 of the second lens element 120 is R4, the focal length of the photographing optical lens assembly is f, the following condition is satisfied: R4/f=1.54.

When a focal length of the first lens element 110 is f1, a focal length of the fourth lens element 140 is f4, the following condition is satisfied: |f1/f4|=0.31.

When a focal length of front lens group is ff, a focal length of the rear lens group is fr, the following condition is satisfied: ff/fr=1.06. In this embodiment, ff is equal to a composite focal length of the first lens element 110, the second lens element 120, the third lens element 130 and the fourth lens element 140. Moreover, fr is equal to a composite focal length of the fifth lens element 150 and the sixth lens element 160.

When the number of the lens elements (110-160) of the photographing optical lens assembly having an Abbe number smaller than 40 is Vn(40), the following condition is satisfied: Vn(40)=6.

When the number of the lens elements (110-160) of the photographing optical lens assembly having an Abbe number smaller than 30 is Vn(30), the following condition is satisfied: Vn(30)=5.

The detailed optical data of the 1st embodiment are shown in Table 1 below.

TABLE 1

1st Embodiment
f = 1.80 mm, Fno = 1.50, HFOV = 65.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.518 | 0.800 | Glass | 2.051 | 17.0 | −4.71 |
| 2 | | 3.118 | 2.837 | | | | |
| 3 | Lens 2 | 5.365 | 0.800 | Glass | 1.654 | 32.2 | −10.03 |
| 4 | | 2.777 | 0.800 | | | | |
| 5 | Lens 3 | 7.943 | 2.256 | Glass | 2.051 | 17.0 | 4.76 |
| 6 | | −11.533 | 0.160 | | | | |
| 7 | Lens 4 | −5.895 | 3.083 | Glass | 2.051 | 17.0 | 15.44 |
| 8 | | −5.484 | −0.063 | | | | |
| 9 | Ape. Stop | Plano | 0.163 | | | | |
| 10 | Lens 5 | 8.730 | 3.833 | Glass | 2.051 | 17.0 | 4.09 |
| 11 | | −6.580 | 0.286 | | | | |
| 12 | Lens 6 | −3.707 | 1.446 | Glass | 1.816 | 23.8 | −15.19 |
| 13 | | −6.216 | 0.500 | | | | |
| 14 | Filter | Plano | 0.400 | Glass | 1.508 | 64.2 | — |
| 15 | | Plano | 1.200 | | | | |
| 16 | Image | Plano | — | | | | |

Note:
Reference wavelength is 940 nm.

In Table 1, the curvature radius, the thickness and the focal length are shown in millimeters (mm). Surface numbers 0-16 represent the surfaces sequentially arranged from the object side to the image side along the optical axis. The tables presented below for each embodiment are the corresponding schematic parameter and aberration curves, and the definitions of the terms in the tables for detailed optical data are the same as Table 1 of the 1st embodiment. Therefore, an explanation in this regard will not be provided again.

2nd Embodiment

Figure 3:
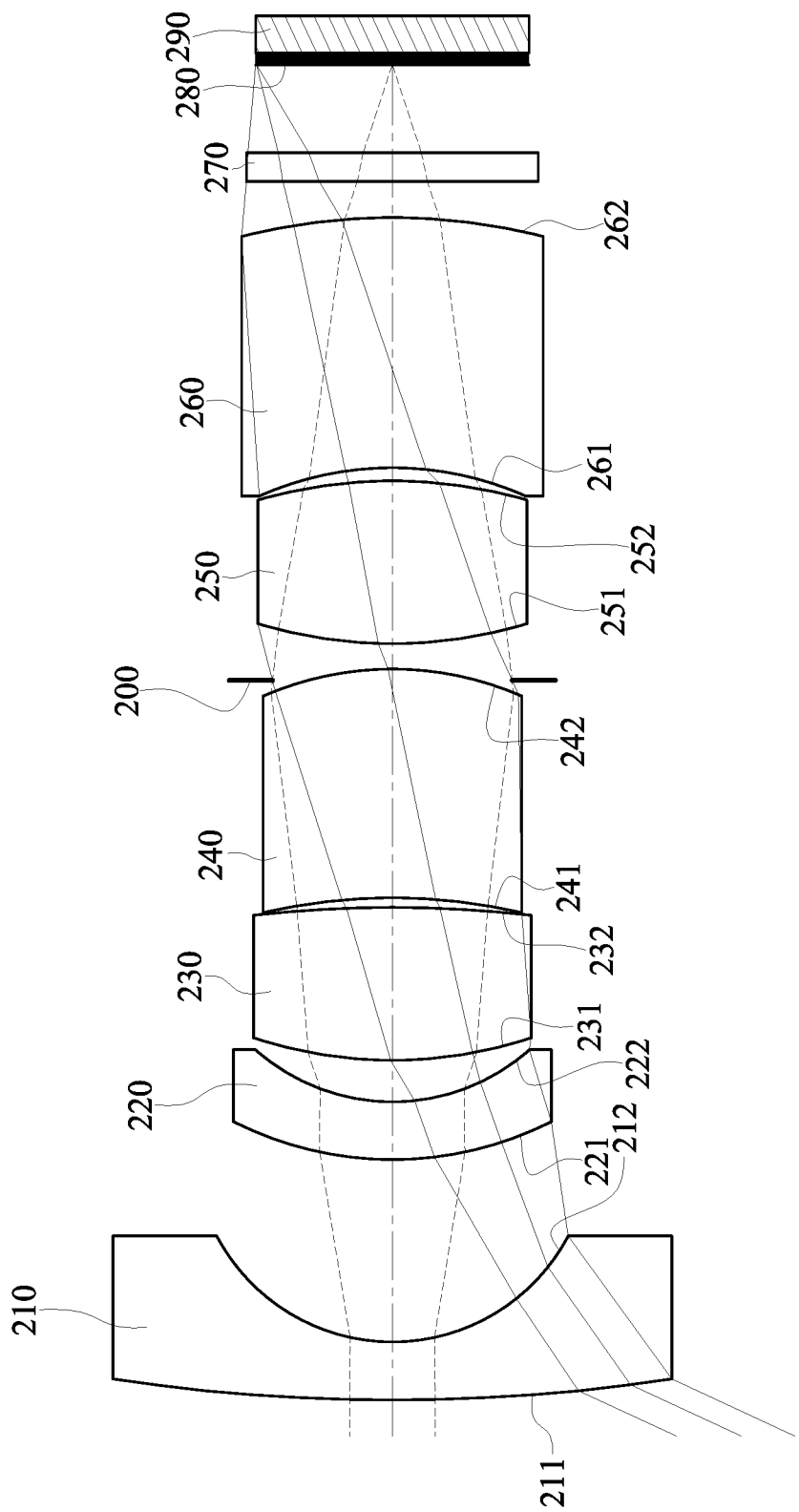
FIG. 3 is a schematic view of an image capturing unit according to the 2nd embodiment of the present disclosure.
Figure 4:
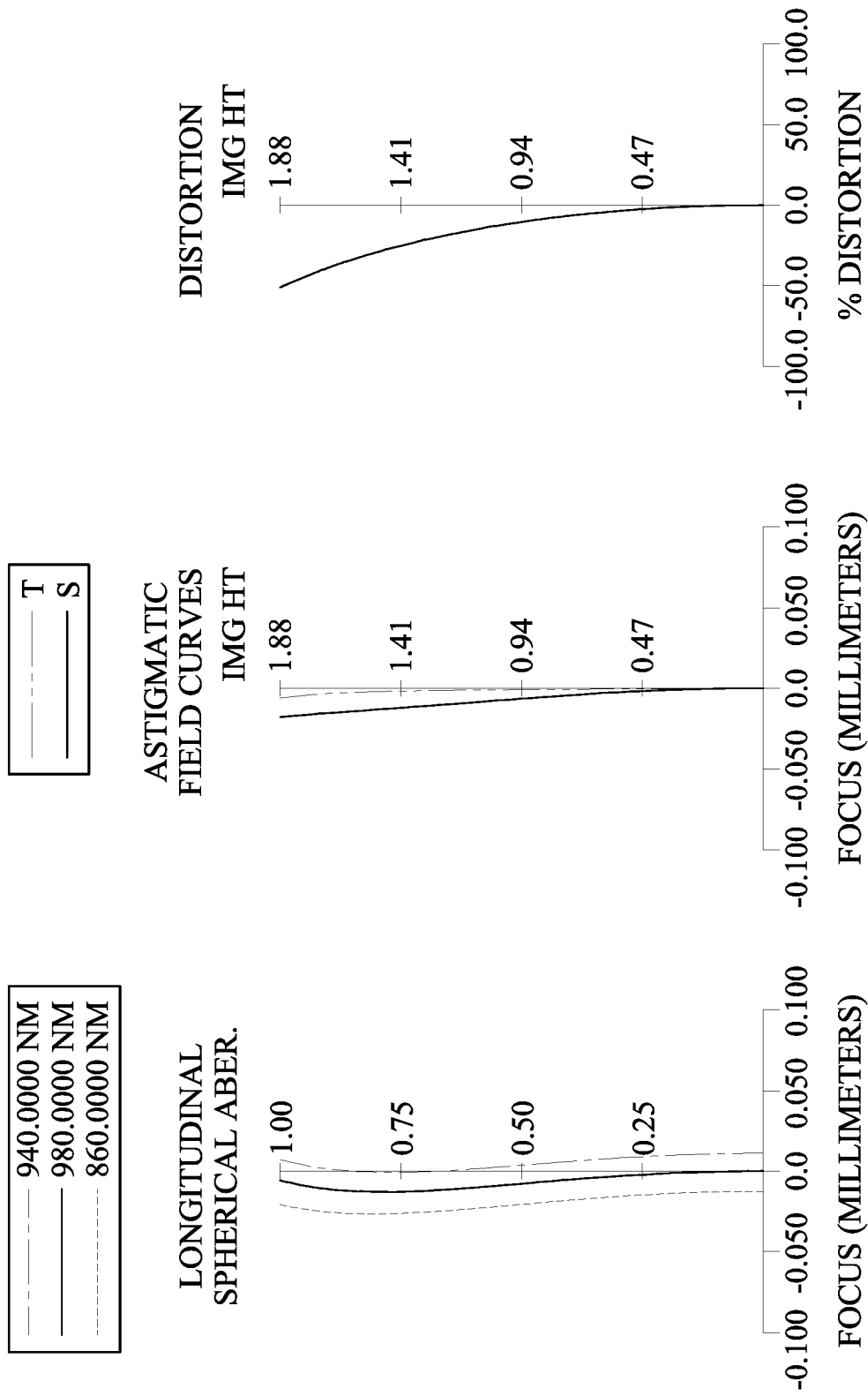
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 290. The photographing optical lens assembly includes, in order from an object side to an image side, a first lens element 210, a second lens element 220, a third lens element 230, a fourth lens element 240, an aperture stop 200, a fifth lens element 250, a sixth lens element 260, a filter 270 and an image surface 280, wherein the photographing optical lens assembly has a total of six lens elements (210-260). A front lens group includes the first lens element 210, the second lens element 220, the third lens element 230 and the fourth lens element 240, and a rear lens group includes the fifth lens element 250 and the sixth lens element 260.

The first lens element 210 with negative refractive power has an object-side surface 211 being convex and an image-side surface 212 being concave. The first lens element 210 is made of glass material and has the object-side surface 211 and the image-side surface 212 being both spherical.

The second lens element 220 with negative refractive power has an object-side surface 221 being convex and an image-side surface 222 being concave. The second lens element 220 is made of glass material and has the object-side surface 221 and the image-side surface 222 being both spherical. The third lens element 230 with positive refractive power has an object-side surface 231 being convex and an image-side surface 232 being convex. The third lens element 230 is made of glass material and has the object-side surface 231 and the image-side surface 232 being both spherical.

The fourth lens element 240 with positive refractive power has an object-side surface 241 being concave and an image-side surface 242 being convex. The fourth lens element 240 is made of glass material and has the object-side surface 241 and the image-side surface 242 being both spherical.

The fifth lens element 250 with positive refractive power has an object-side surface 251 being convex and an image-side surface 252 being convex. The fifth lens element 250 is made of glass material and has the object-side surface 251 and the image-side surface 252 being both spherical.

The sixth lens element 260 with negative refractive power has an object-side surface 261 being concave and an image-side surface 262 being convex. The sixth lens element 260 is made of glass material and has the object-side surface 261 and the image-side surface 262 being both spherical.

The filter 270 is made of glass material and located between the sixth lens element 260 and the image surface 280, and will not affect the focal length of the photographing optical lens assembly. The image sensor 290 is disposed on or near the image surface 280 of the photographing optical lens assembly.

The detailed optical data of the 2nd embodiment are shown in Table 2 below.

TABLE 2

2nd Embodiment
f = 1.90 mm, Fno = 1.60, HFOV = 65.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 25.817 | 0.800 | Glass | 1.818 | 23.8 | −3.82 |
| 2 | | 2.750 | 2.530 | | | | |
| 3 | Lens 2 | 4.858 | 0.800 | Glass | 1.818 | 23.8 | −10.29 |
| 4 | | 2.852 | 0.573 | | | | |
| 5 | Lens 3 | 6.068 | 2.124 | Glass | 1.818 | 23.8 | 5.70 |
| 6 | | −16.900 | 0.133 | | | | |
| 7 | Lens 4 | −7.843 | 3.170 | Glass | 1.818 | 23.8 | 8.87 |
| 8 | | −4.452 | −0.159 | | | | |
| 9 | Ape. Stop | Plano | 0.509 | | | | |
| 10 | Lens 5 | 6.376 | 2.253 | Glass | 1.818 | 23.8 | 4.32 |
| 11 | | −6.655 | 0.182 | | | | |
| 12 | Lens 6 | −4.528 | 3.468 | Glass | 1.818 | 23.8 | −19.85 |
| 13 | | −8.443 | 0.500 | | | | |
| 14 | Filter | Plano | 0.400 | Glass | 1.509 | 64.2 | — |
| 15 | | Plano | 1.217 | | | | |
| 16 | Image | Plano | — | | | | |

Note:
Reference wavelength is 900 nm.

In the 2nd embodiment, the definitions of these parameters shown in the following table are the same as those stated in the 1st embodiment with corresponding values for the 2nd embodiment, so an explanation in this regard will not be provided again.

Moreover, these parameters can be calculated from Table 2 as the following values and satisfy the following conditions:

| 2nd Embodiment | | | |
|---|---|---|---|
| f [mm] | 1.90 | SDavg/SDstop | 1.12 |
| f/EPD | 1.60 | ImgH/EPD | 1.58 |
| HFOV [deg.] | 65.1 | R4/f | 1.50 |
| FOV [deg.] | 130.2 | |f1/f4| | 0.43 |
| TL/f | 9.74 | ff/fr | 0.84 |
| BL/TL | 0.11 | Vn(40) | 6 |
| T12/ΣAT | 0.67 | Vn(30) | 6 |

3rd Embodiment

Figure 5:
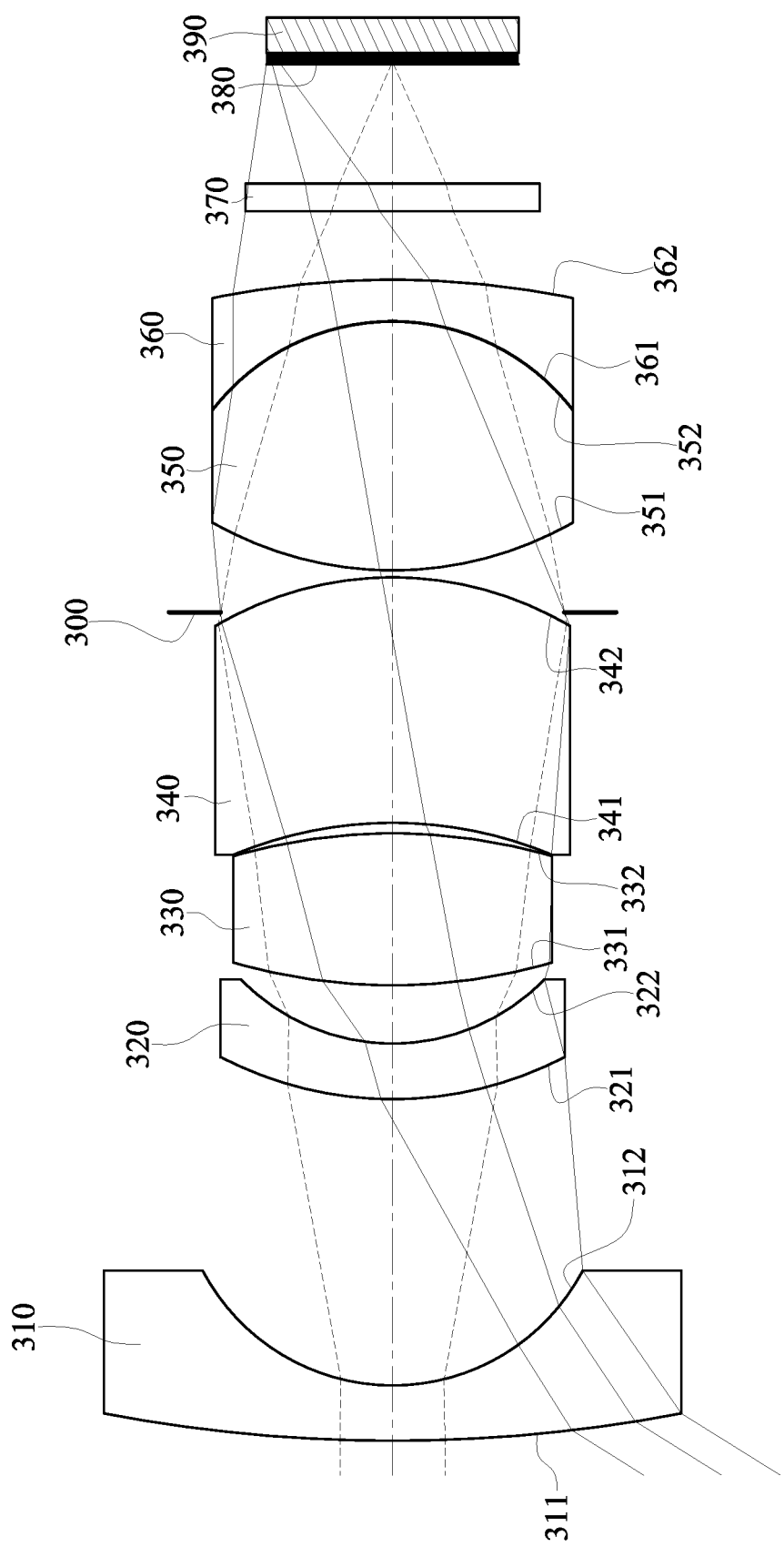
FIG. 5 is a schematic view of an image capturing unit according to the 3rd embodiment of the present disclosure.
Figure 6:
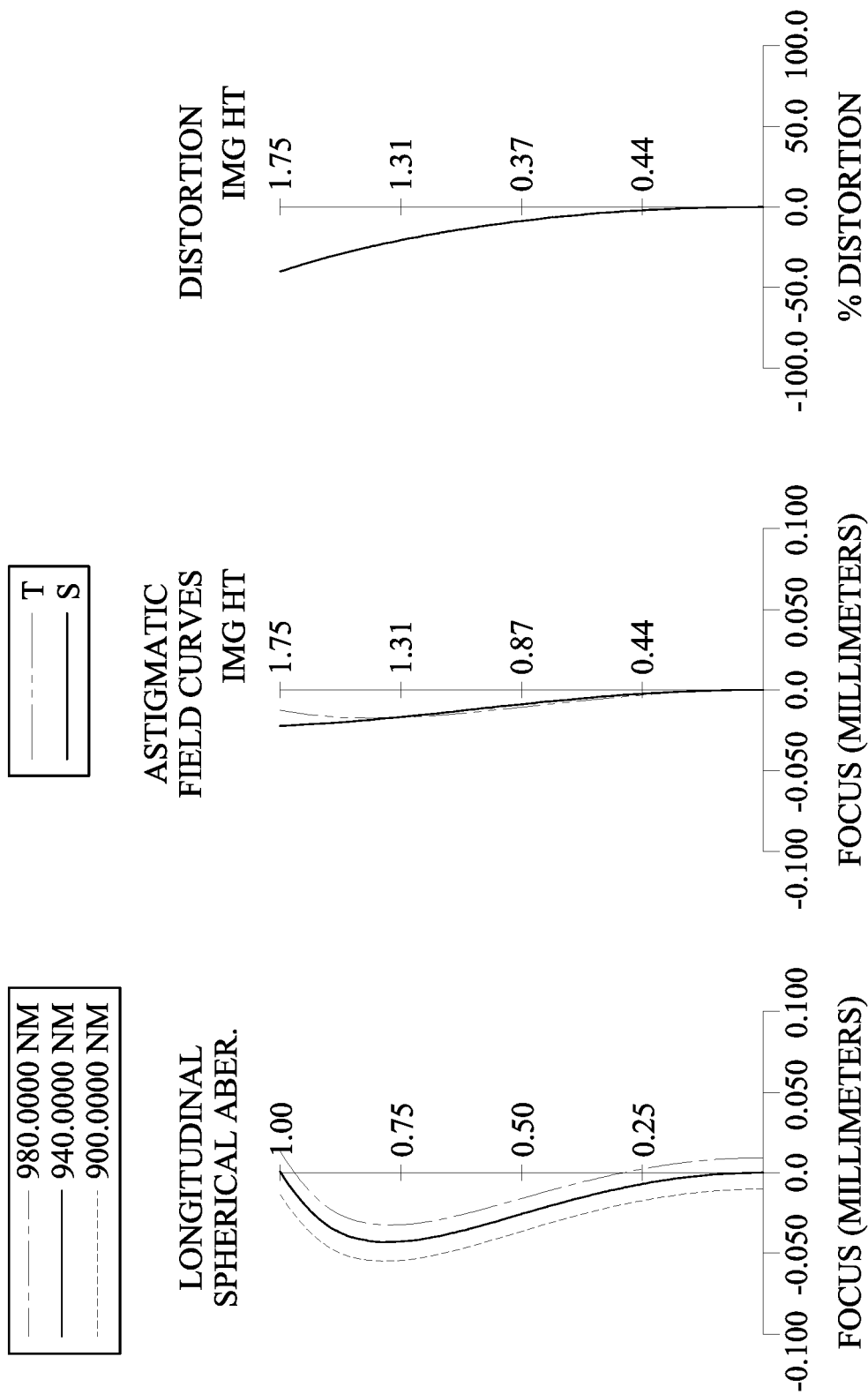
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 390. The photographing optical lens assembly includes, in order from an object side to an image side, a first lens element 310, a second lens element 320, a third lens element 330, a fourth lens element 340, an aperture stop 300, a fifth lens element 350, a sixth lens element 360, a filter 370 and an image surface 380, wherein the photographing optical lens assembly has a total of six lens elements (310-360). A front lens group includes the first lens element 310, the second lens element 320, the third lens element 330 and the fourth lens element 340, and a rear lens group includes the fifth lens element 350 and the sixth lens element 360.

The first lens element 310 with negative refractive power has an object-side surface 311 being convex and an image-side surface 312 being concave. The first lens element 310 is made of glass material and has the object-side surface 311 and the image-side surface 312 being both spherical.

The second lens element 320 with negative refractive power has an object-side surface 321 being convex and an image-side surface 322 being concave. The second lens element 320 is made of glass material and has the object-side surface 321 and the image-side surface 322 being both spherical.

The third lens element 330 with positive refractive power has an object-side surface 331 being convex and an image-side surface 332 being convex. The third lens element 330 is made of glass material and has the object-side surface 331 and the image-side surface 332 being both spherical.

The fourth lens element 340 with positive refractive power has an object-side surface 341 being concave and an image-side surface 342 being convex. The fourth lens element 340 is made of glass material and has the object-side surface 341 and the image-side surface 342 being both spherical.

The fifth lens element 350 with positive refractive power has an object-side surface 351 being convex and an image-side surface 352 being convex. The fifth lens element 350 is made of glass material and has the object-side surface 351 and the image-side surface 352 being both spherical.

The sixth lens element 360 with negative refractive power has an object-side surface 361 being concave and an image-side surface 362 being convex. The sixth lens element 360 is made of glass material and has the object-side surface 361 and the image-side surface 362 being both spherical. The fifth lens element 350 is cemented to the sixth lens element 360.

The filter 370 is made of glass material and located between the sixth lens element 360 and the image surface 380, and will not affect the focal length of the photographing optical lens assembly. The image sensor 390 is disposed on or near the image surface 380 of the photographing optical lens assembly.

In this embodiment, the fifth lens element 350 has the strongest refractive power among all lens elements of the photographing optical lens assembly (310-360). Since the refractive power of a lens element is inversely related to its focal length, the fifth lens element 350 has the largest absolute value of refractive power as shown in the Table 3 below by having the smallest focal length value (|f5|=4.06).

The detailed optical data of the 3rd embodiment are shown in Table 3 below.

In the 3rd embodiment, the definitions of these parameters shown in the following table are the same as those stated in the 1st embodiment with corresponding values for the 3rd embodiment, so an explanation in this regard will not be provided again.

Moreover, these parameters can be calculated from Table 3 as the following values and satisfy the following conditions:

| 3rd Embodiment | | | |
|---|---|---|---|
| f [mm] | 1.91 | SDavg/SDstop | 0.95 |
| f/EPD | 1.25 | ImgH/EPD | 1.15 |
| HFOV [deg.] | 58.0 | R4/f | 1.61 |
| FOV [deg.] | 116.0 | |f1/f4| | 0.31 |
| TL/f | 10.47 | ff/fr | 0.52 |
| BL/TL | 0.16 | Vn(40) | 5 |
| T12/ΣAT | 0.79 | Vn(30) | 5 |

4th Embodiment

Figure 7:
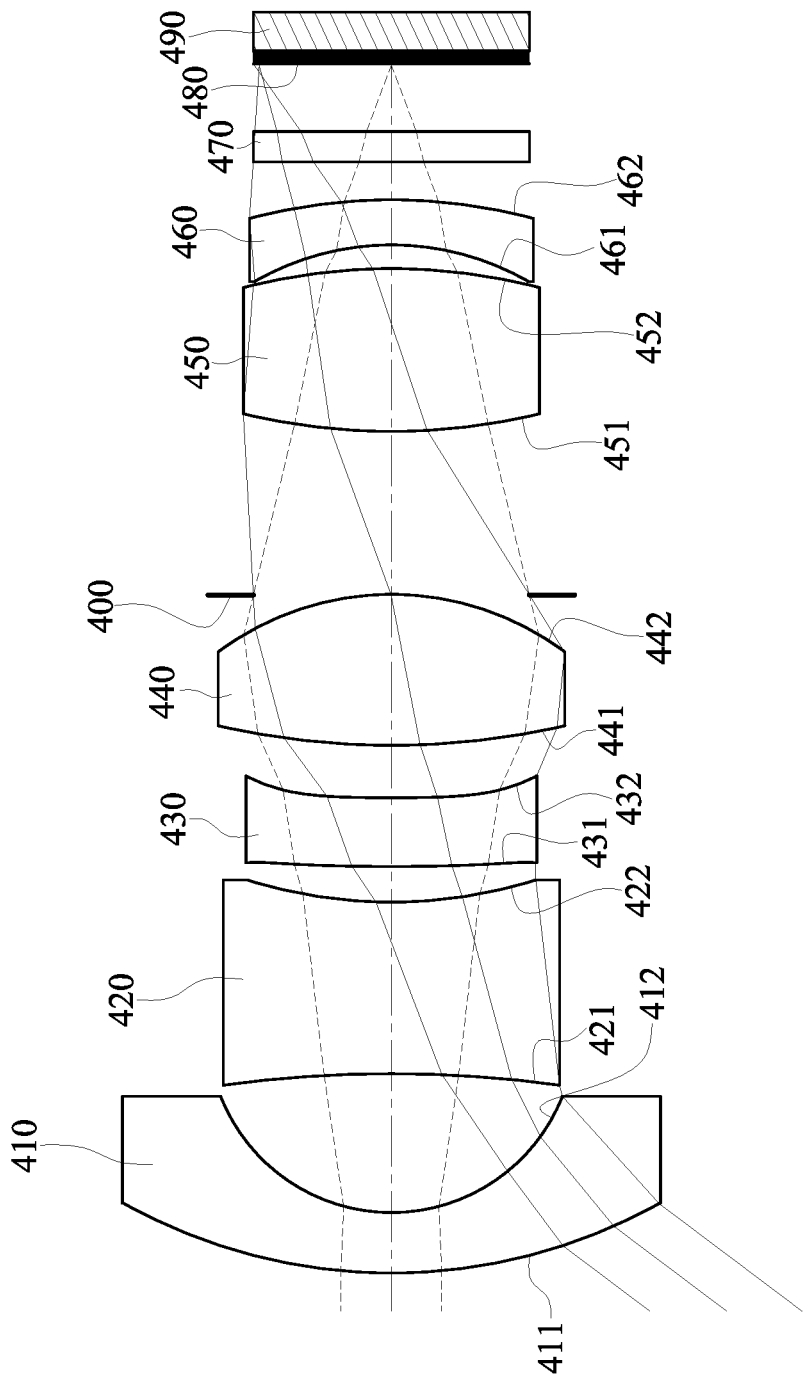
FIG. 7 is a schematic view of an image capturing unit according to the 4th embodiment of the present disclosure.
Figure 8:
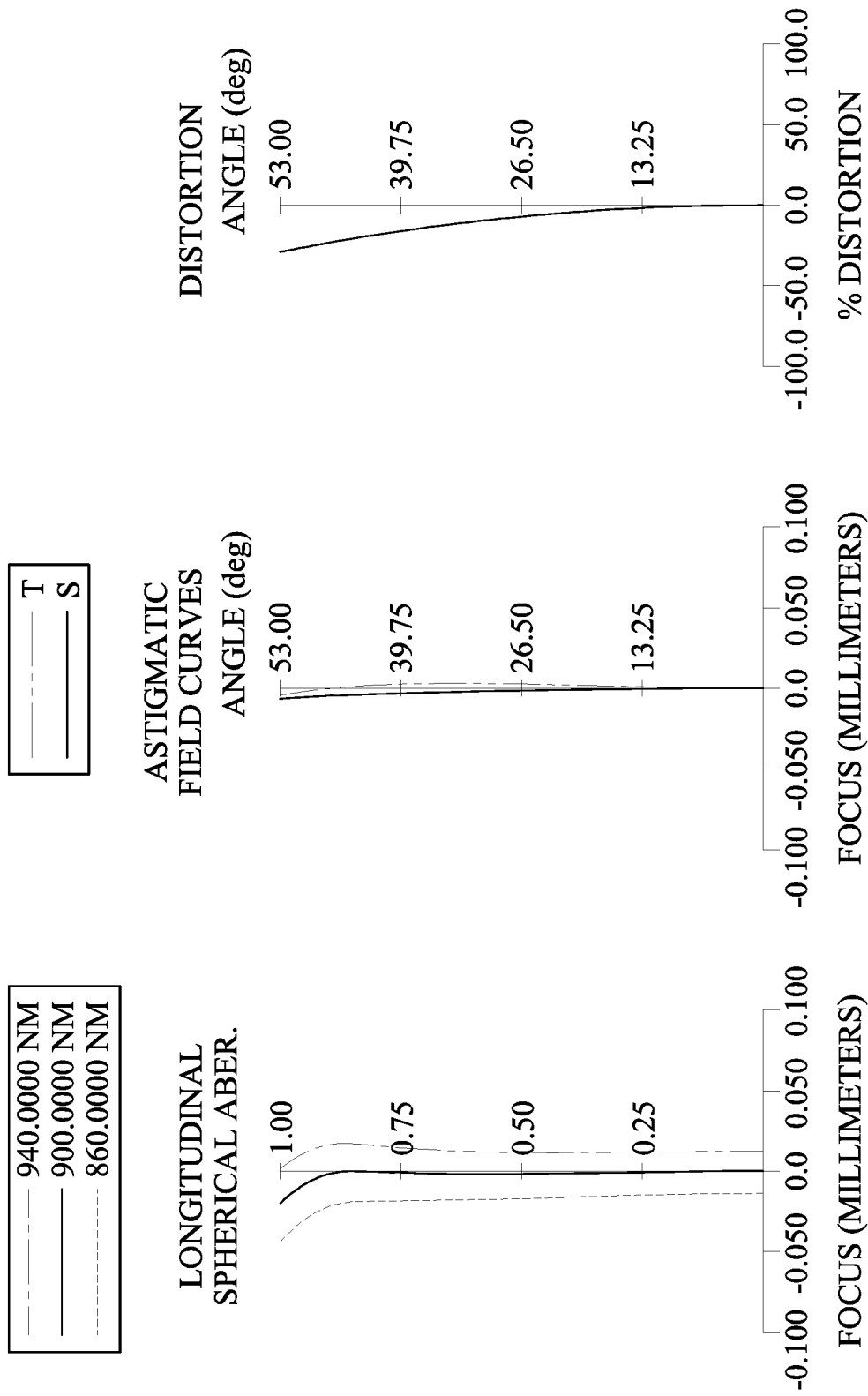
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 490. The photographing optical lens assembly includes, in order from an object side to an image side, a first lens element 410, a second lens element 420, a third lens element 430, a fourth lens element 440, an aperture stop 400, a fifth lens element 450, a sixth lens element 460, a filter 470 and an image surface 480, wherein the photographing optical lens assembly has a total of six lens elements (410-460). A front lens group includes the first lens element 410, the second lens element 420, the third lens element 430 and the fourth lens element 440, and a rear lens group includes the fifth lens element 450 and the sixth lens element 460.

The first lens element 410 with negative refractive power has an object-side surface 411 being convex and an image-

TABLE 3

3rd Embodiment
f = 1.91 mm, Fno = 1.25, HFOV = 58.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 22.246 | 0.800 | Glass | 1.816 | 23.8 | −4.53 |
| 2 | | 3.119 | 4.160 | | | | |
| 3 | Lens 2 | 5.396 | 0.810 | Glass | 1.706 | 28.5 | −11.86 |
| 4 | | 3.076 | 0.847 | | | | |
| 5 | Lens 3 | 8.243 | 2.210 | Glass | 1.816 | 23.8 | 5.38 |
| 6 | | −8.243 | 0.153 | | | | |
| 7 | Lens 4 | −5.987 | 3.570 | Glass | 1.816 | 23.8 | 14.54 |
| 8 | | −5.045 | −0.510 | | | | |
| 9 | Ape. Stop | Plano | 0.610 | | | | |
| 10 | Lens 5 | 5.275 | 3.610 | Glass | 1.593 | 43.7 | 4.06 |
| 11 | | −3.302 | 0.010 | Cement | 1.501 | 38.8 | |
| 12 | Lens 6 | −3.302 | 0.600 | Glass | 1.816 | 23.8 | −5.59 |
| 13 | | −12.964 | 1.000 | | | | |
| 14 | Filter | Plano | 0.400 | Glass | 1.508 | 64.2 | — |
| 15 | | Plano | 1.735 | | | | |
| 16 | Image | Plano | — | | | | |

Note:
Reference wavelength is 940 nm.

side surface 412 being concave. The first lens element 410 is made of glass material and has the object-side surface 411 and the image-side surface 412 being both spherical.

The second lens element 420 with negative refractive power has an object-side surface 421 being concave and an image-side surface 422 being concave. The second lens element 420 is made of glass material and has the object-side surface 421 and the image-side surface 422 being both spherical.

The third lens element 430 with negative refractive power has an object-side surface 431 being convex and an image-side surface 432 being concave. The third lens element 430 is made of plastic material and has the object-side surface 431 and the image-side surface 432 being both aspheric.

The fourth lens element 440 with positive refractive power has an object-side surface 441 being convex and an image-side surface 442 being convex. The fourth lens element 440 is made of glass material and has the object-side surface 441 and the image-side surface 442 being both spherical.

The fifth lens element 450 with positive refractive power has an object-side surface 451 being convex and an image-side surface 452 being convex. The fifth lens element 450 is made of glass material and has the object-side surface 451 and the image-side surface 452 being both spherical.

The sixth lens element 460 with negative refractive power has an object-side surface 461 being concave and an image-side surface 462 being convex. The sixth lens element 460 is made of glass material and has the object-side surface 461 and the image-side surface 462 being both spherical.

The filter 470 is made of glass material and located between the sixth lens element 460 and the image surface 480, and will not affect the focal length of the photographing optical lens assembly. The image sensor 490 is disposed on or near the image surface 480 of the photographing optical lens assembly.

The equation of the aspheric surface profiles of the aforementioned lens elements of the 4th embodiment is expressed as follows:

$$X(Y) = (Y^2/R)/\left(1 + sqrt\left(1 - (1+k) \times (Y/R)^2\right)\right) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

The detailed optical data of the 4th embodiment are shown in Table 4 and the aspheric surface data are shown in Table 5 below.

TABLE 4

4th Embodiment
f = 1.90 mm, Fno = 1.43, HFOV = 53.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.253 | 0.800 | Glass | 1.818 | 23.8 | −4.82 |
| 2 | | 2.428 | 1.842 | | | | |
| 3 | Lens 2 | −16.317 | 2.266 | Glass | 1.509 | 64.2 | −8.66 |
| 4 | | 6.324 | 0.472 | | | | |
| 5 | Lens 3 | 32.577 (ASP) | 0.909 | Plastic | 1.618 | 23.5 | −292.68 |
| 6 | | 27.311 (ASP) | 0.691 | | | | |
| 7 | Lens 4 | 10.227 | 1.998 | Glass | 1.818 | 23.8 | 3.64 |
| 8 | | −3.825 | −0.006 | | | | |
| 9 | Ape. Stop | Plano | 2.162 | | | | |
| 10 | Lens 5 | 8.297 | 2.152 | Glass | 1.818 | 23.8 | 5.21 |
| 11 | | −7.723 | 0.313 | | | | |
| 12 | Lens 6 | −3.620 | 0.600 | Glass | 1.818 | 23.8 | −9.58 |
| 13 | | −7.233 | 0.500 | | | | |
| 14 | Filter | Plano | 0.400 | Glass | 1.509 | 64.2 | — |
| 15 | | Plano | 0.901 | | | | |
| 16 | Image | Plano | — | | | | |

Note:
Reference wavelength is 900 nm.

TABLE 5

Aspheric Coefficients

| Surface # | 5 | 6 |
|---|---|---|
| k = | 2.9986E+01 | 3.0000E+01 |
| A4 = | 2.3805E−03 | 1.3743E−02 |
| A6 = | 3.6523E−04 | 1.3247E−03 |
| A8 = | −2.2083E−04 | −5.6953E−05 |
| A10 = | −2.7040E−05 | −3.2601E−05 |
| A12 = | 5.9511E−19 | −5.3066E−19 |
| A14 = | −5.0706E−21 | 9.1345E−21 |
| A16 = | −8.4709E−23 | 6.7187E−23 |

In Table 5, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 5 of the 4th embodiment. Therefore, an explanation in this regard will not be provided again.

In the 4th embodiment, the definitions of these parameters shown in the following table are the same as those stated in the 1st embodiment with to corresponding values for the 4th embodiment, so an explanation in this regard will not be provided again.

Moreover, these parameters can be calculated from Table 4 and Table 5 as the following values and satisfy the following conditions:

| 4th Embodiment | | | |
|---|---|---|---|
| f [mm] | 1.90 | SDavg/SDstop | 1.08 |
| f/EPD | 1.43 | ImgH/EPD | 1.32 |
| HFOV [deg.] | 53.0 | R4/f | 3.33 |
| FOV [deg.] | 106.0 | |f1/f4| | 1.32 |
| TL/f | 8.42 | ff/fr | 0.29 |
| BL/TL | 0.11 | Vn(40) | 5 |
| T12/ΣAT | 0.34 | Vn(30) | 5 |

5th Embodiment

Figure 9:
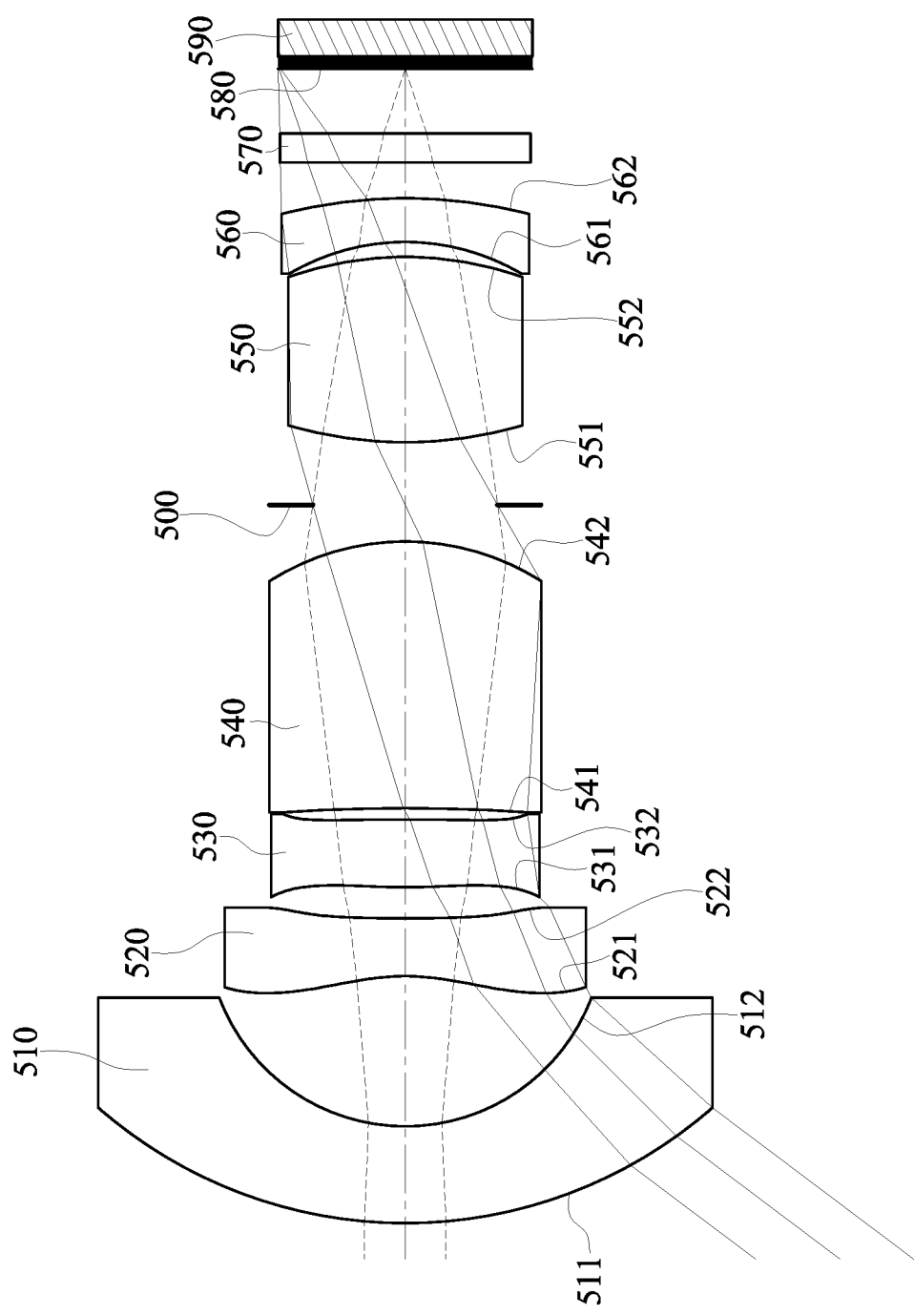
FIG. 9 is a schematic view of an image capturing unit according to the 5th embodiment of the present disclosure.
Figure 10:
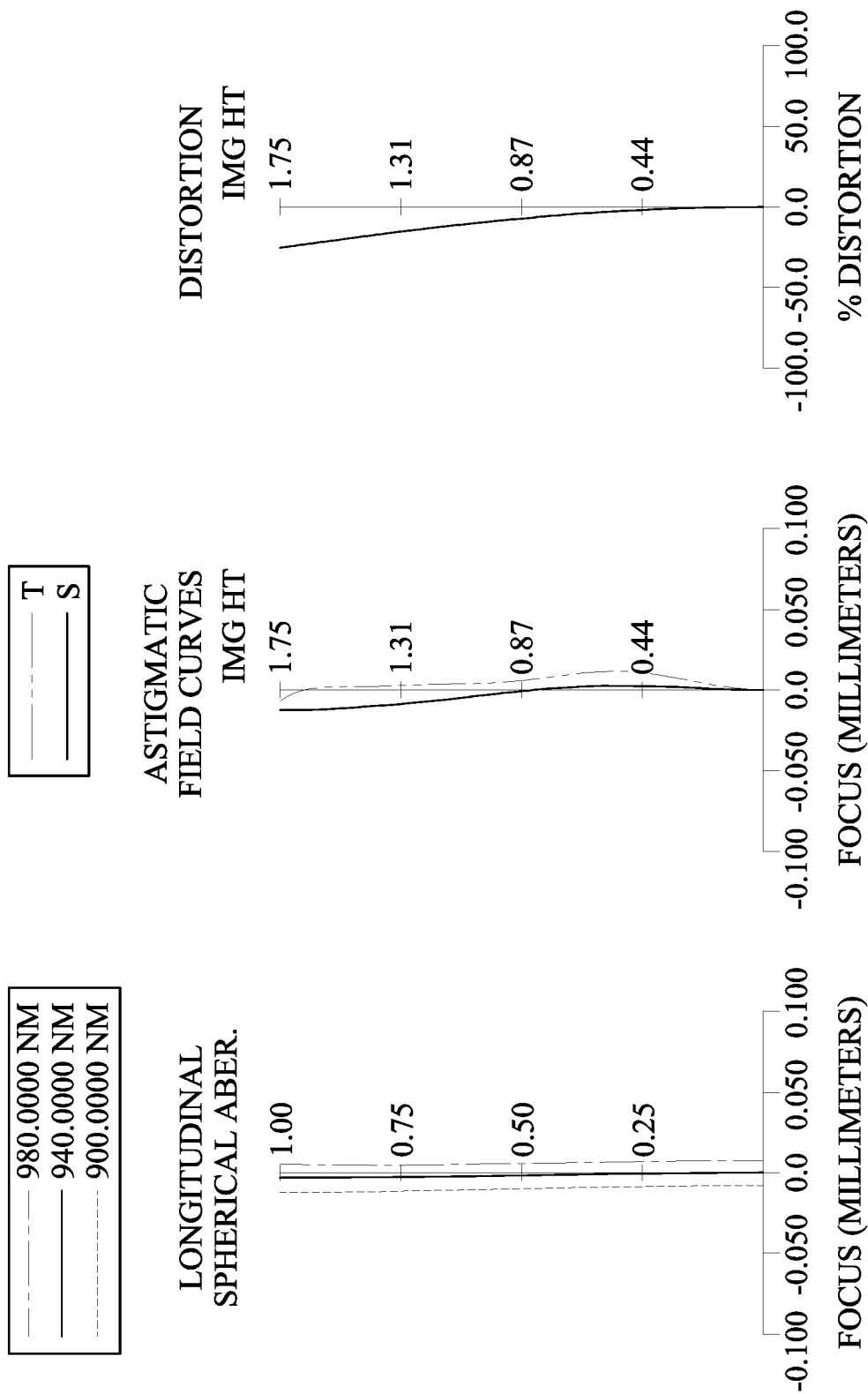
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 590. The photographing optical lens assembly includes, in order from an object side to an image side, a first lens element 510, a second lens element 520, a third lens element 530, a fourth lens element 540, an aperture stop 500, a fifth lens element 550, a sixth lens element 560, a filter 570 and an image surface 580, wherein the photographing optical lens assembly has a total of six lens elements (510-560). A front lens group includes the first lens element 510, the second lens element 520, the third lens element 530 and the fourth lens element 540, and a rear lens group includes the fifth lens element 550 and the sixth lens element 560.

The first lens element 510 with negative refractive power has an object-side surface 511 being convex and an image-side surface 512 being concave. The first lens element 510 is made of glass material and has the object-side surface 511 and the image-side surface 512 being both spherical.

The second lens element 520 with negative refractive power has an object-side surface 521 being concave and an image-side surface 522 being concave. The second lens element 520 is made of plastic material and has the object-side surface 521 and the image-side surface 522 being both aspheric.

The third lens element 530 with positive refractive power has an object-side surface 531 being convex and an image-side surface 532 being convex. The third lens element 530 is made of plastic material and has the object-side surface 531 and the image-side surface 532 being both aspheric.

The fourth lens element 540 with positive refractive power has an object-side surface 541 being concave and an image-side surface 542 being convex. The fourth lens element 540 is made of glass material and has the object-side surface 541 and the image-side surface 542 being both spherical.

The fifth lens element 550 with positive refractive power has an object-side surface 551 being convex and an image-side surface 552 being convex. The fifth lens element 550 is made of glass material and has the object-side surface 551 and the image-side surface 552 being both spherical.

The sixth lens element 560 with negative refractive power has an object-side surface 561 being concave and an image-side surface 562 being convex. The sixth lens element 560 is made of glass material and has the object-side surface 561 and the image-side surface 562 being both spherical.

The filter 570 is made of glass material and located between the sixth lens element 560 and the image surface 580, and will not affect the focal length of the photographing optical lens assembly. The image sensor 590 is disposed on or near the image surface 580 of the photographing optical lens assembly.

In this embodiment, the fifth lens element 550 has the strongest refractive power among all lens elements of the photographing optical lens assembly (510-560). Since the refractive power of a lens element is inversely related to its focal length, the fifth lens element 550 has the largest absolute value of refractive power as shown in the Table 6 below by having the smallest focal length value (|f5|=3.72).

The detailed optical data of the 5th embodiment are shown in Table 6 and the aspheric surface data are shown in Table 7 below.

TABLE 6

5th Embodiment
f = 1.80 mm, Fno = 1.60, HFOV = 53.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 6.451 | 1.339 | Glass | 1.816 | 23.8 | −7.03 |
| 2 | | 2.754 | 2.083 | | | | |
| 3 | Lens 2 | −3.175 (ASP) | 0.800 | Plastic | 1.535 | 56.0 | −5.02 |
| 4 | | 18.946 (ASP) | 0.431 | | | | |
| 5 | Lens 3 | 7.386 (ASP) | 0.939 | Plastic | 1.634 | 20.4 | 10.38 |
| 6 | | −56.987 (ASP) | 0.159 | | | | |
| 7 | Lens 4 | −23.730 | 3.693 | Glass | 1.816 | 23.8 | 4.65 |
| 8 | | −3.498 | 0.509 | | | | |
| 9 | Ape. Stop | Plano | 0.869 | | | | |
| 10 | Lens 5 | 5.703 | 2.568 | Glass | 1.787 | 46.5 | 3.72 |
| 11 | | −4.833 | 0.209 | | | | |
| 12 | Lens 6 | −3.157 | 0.600 | Glass | 1.816 | 23.8 | −7.75 |
| 13 | | −6.844 | 0.500 | | | | |
| 14 | Filter | Plano | 0.400 | Glass | 1.508 | 64.2 | — |
| 15 | | Plano | 0.901 | | | | |
| 16 | Image | Plano | — | | | | |

Note:
Reference wavelength is 940 nm.

TABLE 7

| Aspheric Coefficients | | | | |
|---|---|---|---|---|
| Surface # | 3 | 4 | 5 | 6 |
| k = | 0.0000E+00 | 0.0000E+00 | −3.6345E+00 | −3.0000E+01 |
| A4 = | 4.0626E−02 | −1.3340E−02 | −5.7267E−02 | −7.9164E−03 |
| A6 = | −3.7954E−03 | 1.8553E−02 | 2.3052E−02 | 1.0448E−02 |
| A8 = | 2.5743E−04 | −5.2398E−03 | −6.6822E−03 | −2.9067E−03 |
| A10 = | 1.4405E−06 | 4.0055E−04 | 6.6546E−04 | 6.1688E−04 |
| A12 = | 9.8499E−15 | −7.7699E−16 | 6.0021E−18 | 2.0990E−18 |
| A14 = | 1.0566E−16 | −1.5150E−18 | −3.4796E−21 | 1.9213E−20 |
| A16 = | 3.4398E−19 | −4.8026E−19 | 1.1752E−22 | 2.7824E−22 |

In the 5th embodiment, the equation of the aspheric surface profiles of the aforementioned lens elements is the same as the equation of the 4th embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 6 and Table 7 as the following values and satisfy the following conditions:

| 5th Embodiment | | | |
|---|---|---|---|
| f [mm] | 1.80 | SDavg/SDstop | 1.33 |
| f/EPD | 1.60 | ImgH/EPD | 1.56 |
| HFOV [deg.] | 53.0 | R4/f | 10.53 |
| FOV [deg.] | 106.0 | |f1/f4| | 1.51 |
| TL/f | 8.89 | ff/fr | 0.65 |
| BL/TL | 0.11 | Vn(40) | 4 |
| T12/ΣAT | 0.49 | Vn(30) | 4 |

6th Embodiment

Figure 11:
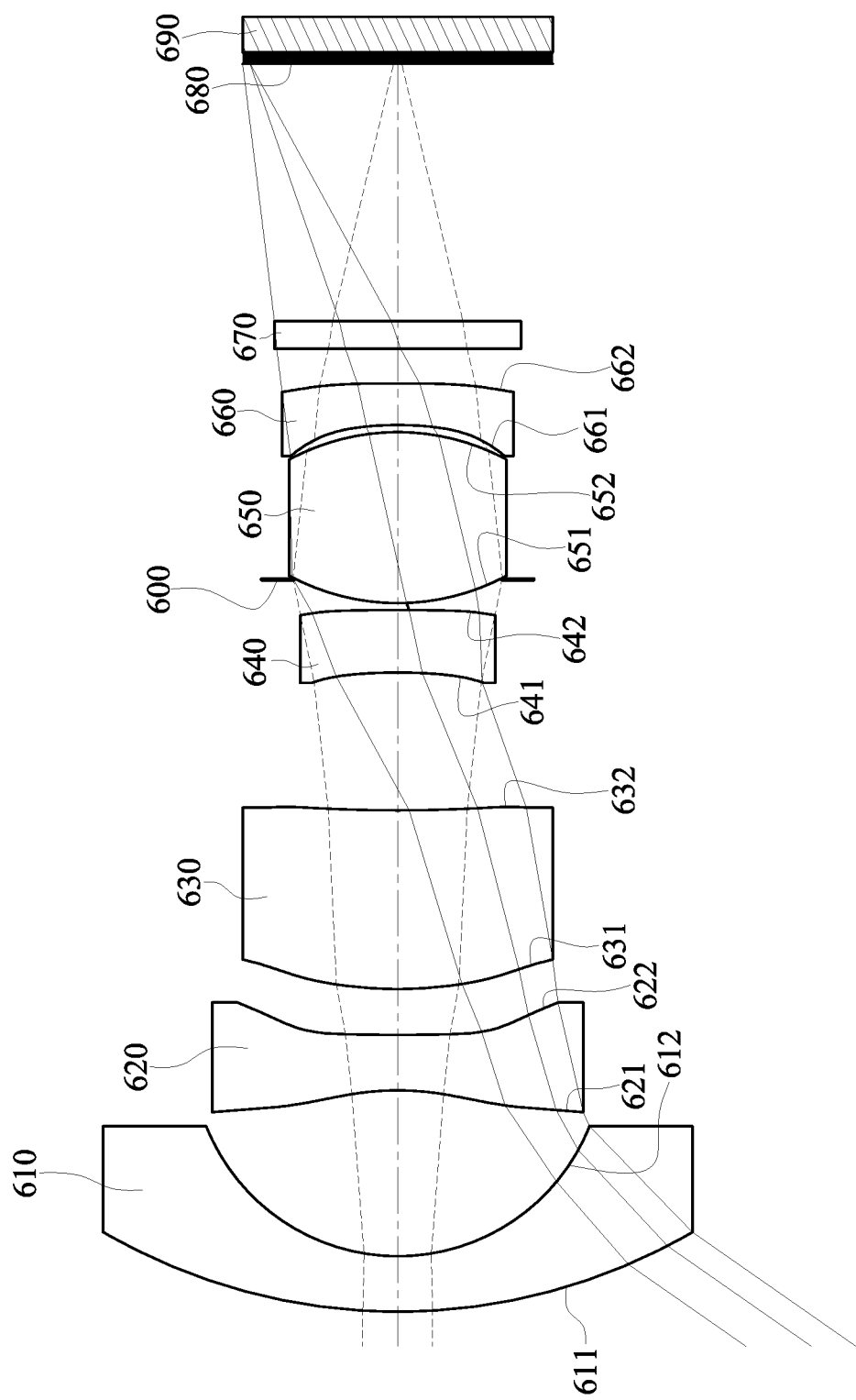
FIG. 11 is a schematic view of an image capturing unit according to the 6th embodiment of the present disclosure.
Figure 12:
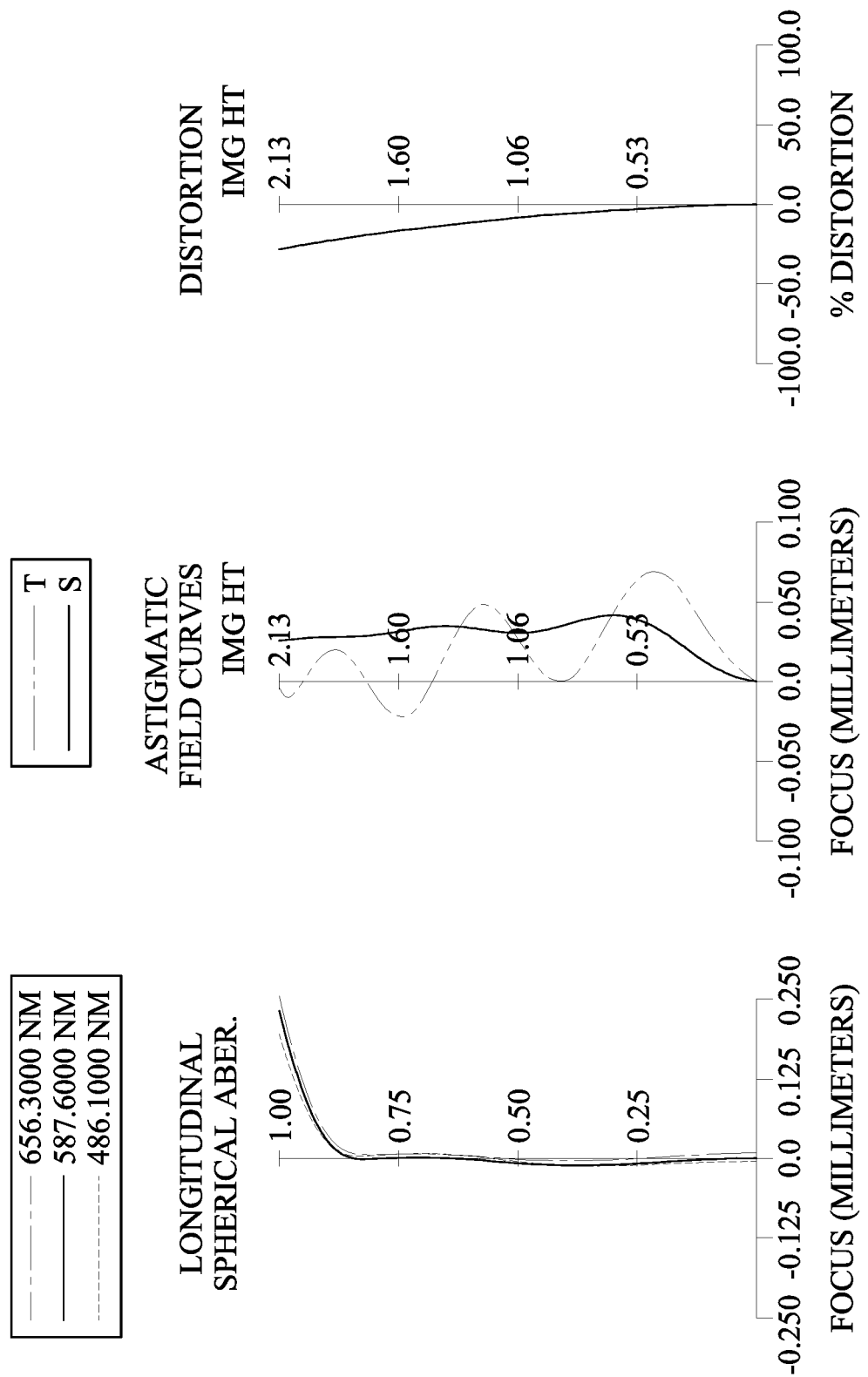
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 690. The photographing optical lens assembly includes, in order from an object side to an image side, a first lens element 610, a second lens element 620, a third lens element 630, a fourth lens element 640, an aperture stop 600, a fifth lens element 650, a sixth lens element 660, a filter 670 and an image surface 680, wherein the photographing optical lens assembly has a total of six lens elements (610-660). A front lens group includes the first lens element 610, the second lens element 620, the third lens element 630 and the fourth lens element 640, and a rear lens group includes the fifth lens element 650 and the sixth lens element 660.

The first lens element 610 with negative refractive power has an object-side surface 611 being convex and an image-side surface 612 being concave. The first lens element 610 is made of glass material and has the object-side surface 611 and the image-side surface 612 being both spherical.

The second lens element 620 with negative refractive power has an object-side surface 621 being concave and an image-side surface 622 being concave. The second lens element 620 is made of plastic material and has the object-side surface 621 and the image-side surface 622 being both aspheric.

The third lens element 630 with positive refractive power has an object-side surface 631 being convex and an image-side surface 632 being concave. The third lens element 630 is made of plastic material and has the object-side surface 631 and the image-side surface 632 being both aspheric.

The fourth lens element 640 with negative refractive power has an object-side surface 641 being concave and an image-side surface 642 being convex. The fourth lens element 640 is made of plastic material and has the object-side surface 641 and the image-side surface 642 being both aspheric.

The fifth lens element 650 with positive refractive power has an object-side surface 651 being convex and an image-side surface 652 being convex. The fifth lens element 650 is made of glass material and has the object-side surface 651 and the image-side surface 652 being both spherical.

The sixth lens element 660 with negative refractive power has an object-side surface 661 being concave and an image-side surface 662 being convex. The sixth lens element 660 is made of plastic material and has the object-side surface 661 and the image-side surface 662 being both aspheric.

The filter 670 is made of glass material and located between the sixth lens element 660 and the image surface 680, and will not affect the focal length of the photographing optical lens assembly. The image sensor 690 is disposed on or near the image surface 680 of the photographing optical lens assembly.

In this embodiment, the fifth lens element 650 has the strongest refractive power among all lens elements of the photographing optical lens assembly (610-660). Since the refractive power of a lens element is inversely related to its focal length, the fifth lens element 650 has the largest absolute value of refractive power as shown in the Table 8 below by having the smallest focal length value (|f5|=2.69).

The detailed optical data of the 6th embodiment are shown in Table 8 and the aspheric surface data are shown in Table 9 below.

TABLE 8

6th Embodiment
f = 2.12 mm, Fno = 2.10, HFOV = 55.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.432 | 0.800 | Glass | 1.729 | 54.5 | −6.72 |
| 2 | | 2.974 | 2.393 | | | | |
| 3 | Lens 2 | −3.873 (ASP) | 0.800 | Plastic | 1.544 | 56.0 | −6.08 |
| 4 | | 24.412 (ASP) | 0.661 | | | | |
| 5 | Lens 3 | 5.168 (ASP) | 2.578 | Plastic | 1.660 | 20.4 | 9.89 |
| 6 | | 19.923 (ASP) | 1.988 | | | | |
| 7 | Lens 4 | −8.319 (ASP) | 0.900 | Plastic | 1.660 | 20.4 | −13.80 |
| 8 | | −100.000 (ASP) | 0.443 | | | | |
| 9 | Ape. Stop | Plano | −0.343 | | | | |
| 10 | Lens 5 | 3.302 | 2.468 | Glass | 1.729 | 54.5 | 2.69 |
| 11 | | −3.301 | 0.102 | | | | |
| 12 | Lens 6 | −5.651 (ASP) | 0.600 | Plastic | 1.660 | 20.4 | −9.35 |
| 13 | | −70.219 (ASP) | 0.500 | | | | |
| 14 | Filter | Plano | 0.400 | Glass | 1.517 | 64.2 | — |
| 15 | | Plano | 3.710 | | | | |
| 16 | Image | Plano | — | | | | |

Note:
Reference wavelength is 587.6 nm (d-line).
Effective radius of the object-side surface of the first lens element (Surface 1) is 4.250 mm.

TABLE 9

Aspheric Coefficients

| Surface # | 3 | 4 | 5 | 6 |
|---|---|---|---|---|
| k = | 0.0000E+00 | 0.0000E+00 | 5.3279E−01 | 9.6128E+00 |
| A4 = | 4.8248E−03 | −1.2738E−02 | −2.4889E−02 | −3.9738E−03 |
| A6 = | 1.2063E−02 | 6.2414E−03 | 1.7003E−02 | 4.7470E−03 |
| A8 = | −3.5395E−03 | 1.3172E−02 | −4.1349E−03 | −2.3505E−03 |
| A10 = | 4.0981E−04 | −7.7873E−03 | 3.1484E−04 | 2.9775E−04 |
| A12 = | −1.3945E−05 | 1.7562E−03 | −1.7249E−08 | −4.0309E−06 |
| A14 = | −9.1912E−07 | −1.8526E−04 | — | — |
| A16 = | 6.3415E−08 | 7.7028E−06 | — | — |

| Surface # | 7 | 8 | 12 | 13 |
|---|---|---|---|---|
| k = | 0.0000E+00 | 0.0000E+00 | 0.0000E+00 | 0.0000E+00 |
| A4 = | −1.7486E−02 | −1.4284E−02 | −3.8783E−02 | −2.3540E−02 |
| A6 = | 3.1572E−03 | 3.9735E−03 | −4.7004E−03 | 2.0262E−03 |
| A8 = | −6.2980E−03 | −4.9535E−03 | 2.0209E−03 | 1.0006E−03 |
| A10 = | 9.8993E−04 | 1.1831E−03 | −1.6814E−04 | −1.3898E−04 |

In the 6th embodiment, the equation of the aspheric surface profiles of the aforementioned lens elements is the same as the equation of the 4th embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 8 and Table 9 as the following values and satisfy the following conditions:

| 6th Embodiment | | | |
|---|---|---|---|
| f [mm] | 2.12 | SDavg/SDstop | 1.08 |
| f/EPD | 2.10 | ImgH/EPD | 2.11 |
| HFOV [deg.] | 55.0 | R4/f | 11.51 |
| FOV [deg.] | 110.0 | |f1/f4| | 0.49 |
| TL/f | 8.49 | ff/fr | −0.79 |
| BL/TL | 0.26 | Vn(40) | 3 |
| T12/ΣAT | 0.46 | Vn(30) | 3 |

The foregoing image capturing unit is able to be installed in, but not limited to, an electronic device, including vehicle backup cameras, dashboard cameras and network surveillance devices. According to the disclosure, the photographing optical lens assembly has a total of six lens elements. The first lens element with negative refractive is favorable for transmitting the light ray at a large view angle from the off-axial region into the photographing optical lens assembly, and the lens element close to the image side of the photographing optical lens assembly is favorable for projecting the incident light ray on the image surface. When specific conditions are satisfied, it is favorable for obtaining a balance between the choices of lens materials and the image quality; especially, it is favorable for obtaining the aforementioned balance when the photographing optical lens assembly is applicable for the infrared wavelength range. Furthermore, it is favorable for providing sufficient amount of incident light at both the paraxial region and the off-axial region so as to enhance the relative illumination when the photographing optical lens assembly has a large view angle. Moreover, it is favorable for providing the photographing optical lens assembly with sufficient field of view and image resolution while preventing the total track length from overly long. In addition, it is favorable for enlarging the field of view.

The foregoing description, for the purpose of explanation, has been described with reference to specific embodiments. It is to be noted that TABLES 1-9 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
    a first lens element;
    a second lens element having negative refractive power;
    a third lens element;
    a fourth lens element;
    a fifth lens element; and
    a sixth lens element having an object-side surface being concave and an image-side surface being convex;
    wherein the photographing optical lens assembly has a total of six lens elements, a number of the lens elements of the photographing optical lens assembly having Abbe number smaller than 30 is Vn(30), an axial distance between the image-side surface of the sixth lens element and an image surface is BL, an axial distance between an object-side surface of the first lens element and the image surface is TL, and the following conditions are satisfied:

$4 \leq Vn(30)$; and $0 < BL/TL < 0.20$.

2. The photographing optical lens assembly of claim 1, wherein a focal length of the first lens element is f1, a focal length of the fourth lens element is f4, and the following condition is satisfied:

$|f1/f4| < 0.80$.

3. The photographing optical lens assembly of claim 1, wherein a focal length of the photographing optical lens assembly is f, an entrance pupil diameter of the photographing optical lens assembly is EPD, and the following condition is satisfied:

$f/EPD < 2.0$.

4. The photographing optical lens assembly of claim 1, wherein a central thickness of the sixth lens element is larger than a central thickness of the fifth lens element.

5. The photographing optical lens assembly of claim 1, wherein the axial distance between the object-side surface of the first lens element and the image surface is TL, a focal length of the photographing optical lens assembly is f, and the following condition is satisfied:

$6.0 < TL/f$.

6. The photographing optical lens assembly of claim 1, wherein the fifth lens element has an object-side surface being convex.

7. The photographing optical lens assembly of claim 1, wherein at least three of the lens elements of the photographing optical lens assembly have negative refractive power.

8. The photographing optical lens assembly of claim 1, wherein a curvature radius of an image-side surface of the second lens element is R4, a focal length of the photographing optical lens assembly is f, and the following condition is satisfied:

$0.50 < R4/f < 4.5$.

9. The photographing optical lens assembly of claim 1, further comprising an aperture stop, wherein a mean of maximum effective radii of surfaces among the third lens element, the fourth lens element, the fifth lens element and the sixth lens element is SDavg, a radius of the aperture stop is SDstop, and the following condition is satisfied:

$0.5 < SDavg/SDstop < 1.25$.

10. The photographing optical lens assembly of claim 1, wherein a maximal field of view of the photographing optical lens assembly is FOV, and the following condition is satisfied:

95 degrees $<$ FOV $<$ 180 degrees.

11. The photographing optical lens assembly of claim 1, wherein a maximum image height of the photographing optical lens assembly is ImgH, an entrance pupil diameter of the photographing optical lens assembly is EPD, and the following condition is satisfied:

$0.60 < ImgH/EPD < 1.80$.

12. The photographing optical lens assembly of claim 1, wherein the number of the lens elements of the photographing optical lens assembly having Abbe number smaller than 30 is Vn(30), and the following condition is satisfied:

$5 \leq Vn(30)$.

13. The photographing optical lens assembly of claim 1, wherein the object-side surface of the first lens element is convex.

14. The photographing optical lens assembly of claim 1, wherein the refractive power of the fifth lens element and the refractive power of the sixth lens element have different signs.

15. The photographing optical lens assembly of claim 1, wherein the axial distance between the image-side surface of the sixth lens element and the image surface is BL, the axial distance between the object-side surface of the first lens element and the image surface is TL, and the following condition is satisfied:

$0.11 \leq BL/TL < 0.20$.

16. The photographing optical lens assembly of claim 1, further comprising an aperture stop, wherein there are a front lens group comprising at least one lens element of the photographing optical lens assembly located between an imaged object and the aperture stop, and a rear lens group comprising the other at least one lens element of the photographing optical lens assembly located between the aperture stop and the image surface, a focal length of the front lens group is ff, a focal length of the rear lens group is fr, and the following condition is satisfied:

$0 < ff/fr < 1.25$.

17. The photographing optical lens assembly of claim 1, wherein an axial distance between the first lens element and the second lens element is T12, a sum of all axial distances between adjacent lens elements of the photographing optical lens assembly is $\Sigma AT$, and the following condition is satisfied:

$$0.45 < T12/\Sigma AT < 0.85.$$

18. The photographing optical lens assembly of claim 1, wherein the photographing optical lens assembly is applicable for a wavelength range from 800 nanometers (nm) to 1200 nm.

19. An image capturing unit, comprising:
   the photographing optical lens assembly of claim 1; and
   an image sensor, wherein the image sensor is disposed on the image side of the photographing optical lens assembly.

20. An electronic device, comprising:
   the image capturing unit of claim 19.

* * * * *